US012591538B1

(12) United States Patent
Chebolu et al.

(10) Patent No.: US 12,591,538 B1
(45) Date of Patent: Mar. 31, 2026

(54) MULTI-PROCESSOR COMMUNICATION FRAMEWORK USING TCP/IP ARCHITECTURE

(71) Applicant: Amazon Technologies, Inc., Seattle, WA (US)

(72) Inventors: Praveen Chebolu, Leander, TX (US); Venkateshwar Junnuthulla, Leander, TX (US); Kranthi Thimmapuram, Cedar Park, TX (US); Shanthini Chetlur Kannan, Sterling, VA (US)

(73) Assignee: Amazon Technologies, Inc., Seattle, WA (US)

( * ) Notice: Subject to any disclaimer, the term of this patent is extended or adjusted under 35 U.S.C. 154(b) by 555 days.

(21) Appl. No.: 18/061,639

(22) Filed: Dec. 5, 2022

(51) Int. Cl.
　　*G06F 15/173* 　　(2006.01)
　　*G06F 15/78* 　　(2006.01)

(52) U.S. Cl.
　　CPC .... *G06F 15/17306* (2013.01); *G06F 15/7807* (2013.01)

(58) Field of Classification Search
　　CPC ...................... G06F 15/17306; G06F 15/7807
　　See application file for complete search history.

(56) References Cited

U.S. PATENT DOCUMENTS

| | | | | |
|---|---|---|---|---|
| 6,870,842 B1 * | 3/2005 | Caronni | ................. | H04L 12/18 |
| | | | | 370/432 |
| 8,484,357 B2 | 7/2013 | Shin et al. | | |
| 12,277,060 B2 * | 4/2025 | Kumar | ................ | G06F 12/0811 |
| 2021/0117360 A1 * | 4/2021 | Kutch | ................... | G06F 3/0656 |
| 2022/0244756 A1 * | 8/2022 | Nguyen | ............. | G06F 15/7807 |
| 2022/0283880 A1 * | 9/2022 | Urrego | ................. | G06F 13/387 |
| 2024/0129353 A1 * | 4/2024 | Misra | ..................... | H04L 67/02 |

* cited by examiner

*Primary Examiner* — Peng Ke
(74) *Attorney, Agent, or Firm* — Weaver Austin Villeneuve & Sampson LLP

(57) ABSTRACT

A multi-processor communication framework (MCF) based on Transmission Control Protocol/Internet Protocol (TCP/IP) architecture is defined that can be used for inter-processor communication between heterogenous processing nodes. The MCF includes an application layer, a transport layer, a network layer, and an inter-processor communication (IPC) layer for each processing node. The IPC layer can be used to facilitate data transfer between two processing nodes via a physical channel within an electronic device, or through shared memory. The MCF can support multicast, broadcast, unicast, and zero-copy features like the TCP/IP stack.

20 Claims, 9 Drawing Sheets

500

| MCF_SOCKET API 502 | DESCRIPTION 504 |
|---|---|
| MCF_SOCKET_EX 502a | CREATES SOCKET THAT BINDS TO THAT SPECIFIC INTERFACE |
| MCF_SOCKET 502b | CREATES SOCKET BUT BOUND TO THE DEFAULT INTERFACE. APPLICATION HAS TO ADD ROUTE IN ORDER TO ROUTE THROUGH A SPECIFIC INTERFACE |
| MCF_SOCKET_BIND 502c | ASSOCIATES AND RESERVES A PORT FOR USE BY THE SOCKET. EACH OF THE APPLICATION SERVICE BINDS TO THE DESIGNATED PORTS. IT'S USEFUL MAINLY AT THE RECEIVING END. |
| MCF_SOCKET_CONNECT 502d | USED BY THE SENDER PROCESSING NODE TO ESTABLISH A CONNECTION WITH THE RECIPIENT PROCESSING NODE |
| MCF_SOCKET_IOCTL 502e | API TO CONFIGURE THE SOCKET OR NETWORK LAYERS |
| MCF_SOCKET_SENDTO 502f | SENDS DATA TO THE DESIGNATED NETWORK ADDRESS/PORT |
| MCF_SOCKET_RECV 502g | API TO RECEIVE DATA ON THE BOUND PORT |
| MCF_SOCKET_ACCEPT 502h | USED BY THE RECIPIENT PROCESSING NODE TO GET A SOCKET FOR AN INCOMING CONNECTION FROM THE SENDER PROCESSING NODE |
| MCF_SOCKET_LISTEN 502i | INSTRUCTS TCP PROTOCOL IMPLEMENTATION TO LISTEN FOR CONNECTIONS |
| MCF_SOCKET_CLOSE 502j | CLOSES THE SOCKET |

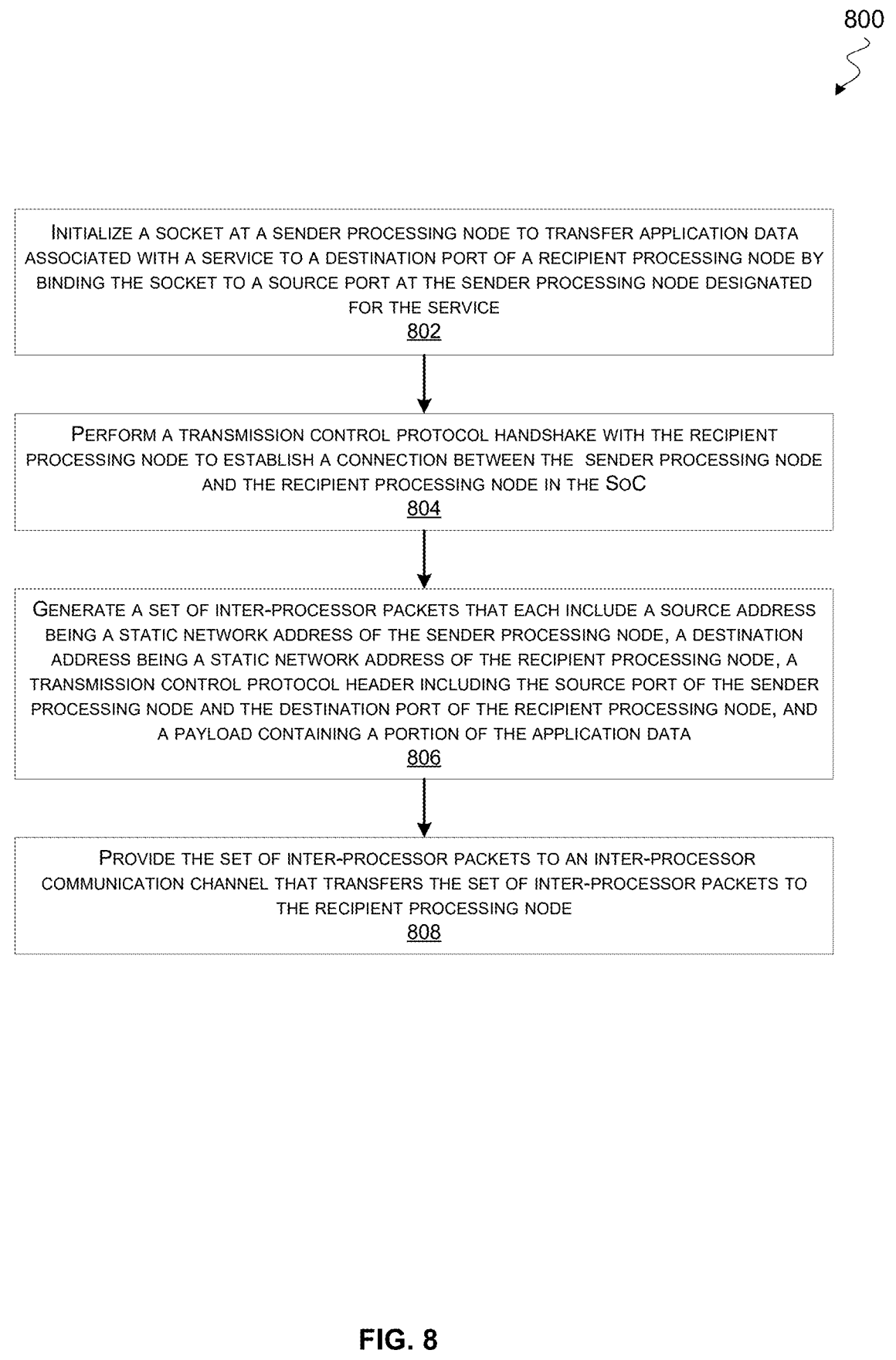

INITIALIZE A SOCKET AT A SENDER PROCESSING NODE TO TRANSFER APPLICATION DATA ASSOCIATED WITH A SERVICE TO A DESTINATION PORT OF A RECIPIENT PROCESSING NODE BY BINDING THE SOCKET TO A SOURCE PORT AT THE SENDER PROCESSING NODE DESIGNATED FOR THE SERVICE
802

PERFORM A TRANSMISSION CONTROL PROTOCOL HANDSHAKE WITH THE RECIPIENT PROCESSING NODE TO ESTABLISH A CONNECTION BETWEEN THE SENDER PROCESSING NODE AND THE RECIPIENT PROCESSING NODE IN THE SoC
804

GENERATE A SET OF INTER-PROCESSOR PACKETS THAT EACH INCLUDE A SOURCE ADDRESS BEING A STATIC NETWORK ADDRESS OF THE SENDER PROCESSING NODE, A DESTINATION ADDRESS BEING A STATIC NETWORK ADDRESS OF THE RECIPIENT PROCESSING NODE, A TRANSMISSION CONTROL PROTOCOL HEADER INCLUDING THE SOURCE PORT OF THE SENDER PROCESSING NODE AND THE DESTINATION PORT OF THE RECIPIENT PROCESSING NODE, AND A PAYLOAD CONTAINING A PORTION OF THE APPLICATION DATA
806

PROVIDE THE SET OF INTER-PROCESSOR PACKETS TO AN INTER-PROCESSOR COMMUNICATION CHANNEL THAT TRANSFERS THE SET OF INTER-PROCESSOR PACKETS TO THE RECIPIENT PROCESSING NODE
808

FIG. 8

MULTI-PROCESSOR COMMUNICATION FRAMEWORK USING TCP/IP ARCHITECTURE

BACKGROUND

Computing devices can demand high performance and high-power efficiency to handle modern-day applications in different fields, such as, audio processing, image processing, and communication standards. As such, a computing device may include multiple processing nodes such as application processors, microcontroller units, digital signal processors, hardware accelerators, or graphics processing units, etc., to achieve desired performance based on the system specification. However, inter-processor communication among the processing nodes can be a challenging task due to a wide range of use cases supported by such computing devices.

BRIEF DESCRIPTION OF THE DRAWINGS

Various embodiments in accordance with the present disclosure will be described with reference to the drawings, in which:

FIG. 5 shows a table comprising examples of socket APIs used by the MCF, and its description;

FIG. 8 illustrates a flow chart for a method for inter-processor communication within a system-on-a-chip (SoC), according to some embodiments.

DETAILED DESCRIPTION

Figure 1:
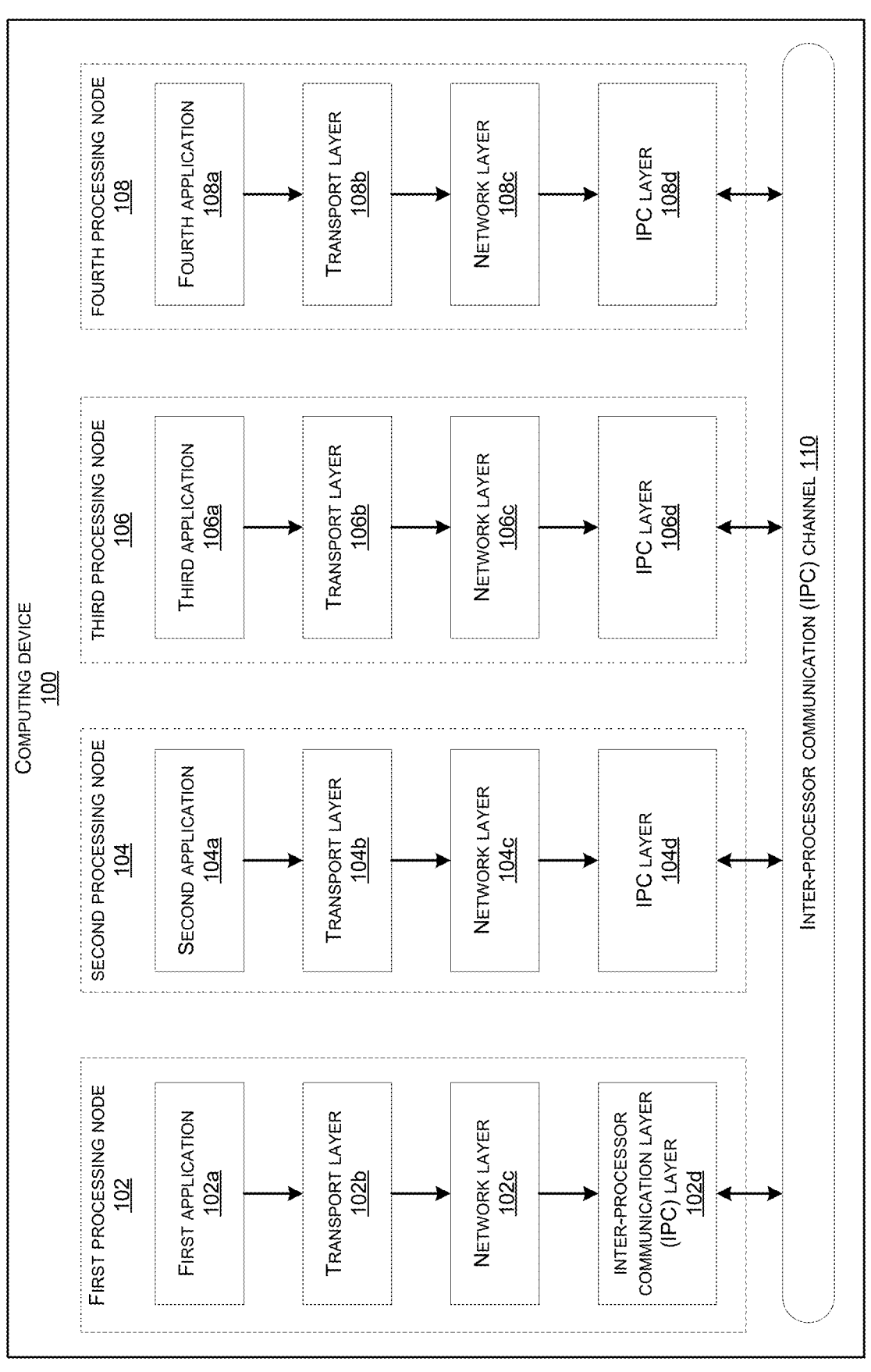
FIG. 1 shows a high-level multi-processor communication framework (MCF) for a computing device comprising multiple processing nodes, in accordance with some embodiments.

Some computing devices may include a variety of processing nodes to achieve the desired performance while keeping high power efficiency to meet the demands of modern-day applications in different fields, such as, audio processing, image processing, and network communication. The processing nodes may include application processors (APs), digital signal processors (DSPs), microcontroller units (MCUs), or computational accelerators (e.g., neural network accelerators, cryptographic accelerators, graphics processing units (GPUs), etc.). These computing devices can be part of embedded computing systems that are designed to perform specific tasks, and can have applications in various fields, such as, internet-of-things, home appliances, consumer electronics, automotive, industrial, telecommunications, etc., and therefore, can support a wide range of use cases, e.g., audio, video, connectivity (e.g., Wi-Fi, Bluetooth), LEDs, sensors, networking, etc.

In most cases, such computing systems may impose an increased programming complexity due to the lack of standards that support heterogeneity of processing nodes, which leads to implementing custom solutions. On the other hand, implementing a new standard for embedded computing systems might induce significant overheads to design new software and hardware support. Current multi-core or multiprocessor solutions may not scale well to current challenges due to different use cases related to different applications, and support for different types of bus interfaces, e.g., Serial Peripheral Interface (SPI), Inter-IC Sound (I2S), Peripheral Component Interconnect express (PCIe), etc.

In most cases, there is no common framework to address the communication needs of such computing devices that include multiple processing nodes. In some cases, customized inter-processor communication mechanisms have been developed for certain products, which cannot be easily adopted to other platforms. In addition, such customized solutions can be difficult to maintain and are generally not cost effective, as the time and resources spent in developing a communication mechanism are specific to each product, and may not extend well to other products or applications.

As demand to achieve low power consumption, and faster response times using always-on (AON) domains increases, custom system-on-chips (SoCs) may be developed with multi-processor architecture. Furthermore, more features and functionalities in future products with embedded computing devices (e.g., sensors, connectivity, LEDs, simple display like clocks, etc.) may be moved to such architecture. These computing devices with multiple processing nodes (e.g., CPUs, MCUs, DSPs, computational accelerators, etc.) in a single SoC, may need to support communication with one another to support different use cases. Thus, there is a need for an inter-processor communication standard that can be scaled to different use cases for different computing devices that have multiple processing nodes without compromising on the power consumption efficiency or performance requirements.

Systems and methods are described to define a multi-processor communication framework (MCF) based on Transmission Control Protocol/Internet Protocol (TCP/IP) architecture that can be used for inter-processor communication between multiple processing nodes. The processing nodes can be processors, processing cores or processing units within an SoC, SoC components on a printed circuit board, or any type of processing ICs having a processor core within a device. The processing nodes can be heterogenous processing nodes (e.g., processing nodes with different architecture, different functionality, different manufacturer, etc.) including an application processor, a digital signal processor, a microcontroller unit, and/or a computational accelerator (e.g., graphics processing unit, neural network accelerator, cryptographic accelerator). Because heterogenous processing nodes can have a wide range of varying features/functionalities and can have different manufacturers, there is typically no standard communication mechanism to transfer inter-processor data between heterogenous processing nodes.

The MCF may include the core functionality of the TCP/IP stack and the high-level application programming interface (API), but the internal implementation of the TCP/IP APIs can be customized to fit the embedded environment. The MCF may include an application layer, a transport layer, a network layer, and an inter-processor communication (IPC) layer that may be similar to the application layer, the transport layer, the network layer, and the link layer of the TCP/IP stack, respectively. However, the MCF may have lower memory requirements since the MCF may not require the overhead of maintaining large data bases or hash tables as compared to the traditional networking TCP/IP stack. Additionally, the MCF may not need to support the IP security and Transport Layer Security (TLS) protocol, which can further lower the memory requirements for the MCF.

Each computing device that comprises a plurality of processing nodes can be assigned a network identifier (ID), and each of the plurality of processing nodes may be assigned an Internet Protocol (IP) address (e.g., IPv4 address) comprising the network ID identifying the computing device and a host ID identifying the processing node. In some examples, the network ID and the host ID can be 16 bits each. For each processing node, different socket ports may be assigned corresponding to each of the use cases or application services. The MCF architecture can support socket APIs used by the TCP/IP stack, which can be used to transfer application data associated with a service from a sender processing node (e.g., a microcontroller unit) to a recipient processing node (e.g., a digital signal processor). An example of an inter-processor data transfer can be a media application executing on a microcontroller unit transferring audio data with an audio manager executing on a digital signal processor to perform audio encoding/decoding. The sender processing node may create a socket and bind the socket to a source port designated for the service. The sender processing node may also perform a TCP handshake with the recipient processing node to establish a connection between the sender processing node and the recipient processing node. In some embodiments, the application data can be encapsulated with an MCF transport layer header and an MCF IP layer header to generate a set of inter-processor packets that can be transferred via an inter-processor communication channel to the recipient processing node.

The inter-processor communication channel, also referred to herein as IPC channel, can include one or more physical buses coupled to the processing nodes, and/or a shared memory accessible by the processing nodes. When the IPC channel is implemented using a physical bus, the physical bus may have its own bus protocol (e.g., SPI, I2C, etc.), and the inter-processor packets including the MCF transport layer header can be transferred on the IPC channel using the bus protocol. The MCF transport layer header may comprise a source port of the sender processing node and a destination port of the recipient processing node. The MCF IP layer header may comprise a source IP address assigned to the sender processing node and a destination IP address assigned to the recipient processing node. Like the TCP/IP, the MCF can also support zero copy, unicast, multicast, and broadcast features.

The MCF has been defined with consideration to reduce developments times needed to adapt to the MCF and ease the remapping of application tasks. The MCF can provide a generic light-weight framework that can be platform independent, operating system (OS) agnostic, portable, and with low memory footprint. Additionally, the MCF does not restrict the system topology, which can be homogeneous or heterogeneous architectures located on a single IC device or multiple IC devices in the printed circuit board. The MCF can allow the applications to establish inter-processor communication in a standardized manner, increasing code portability and reuse. The MCF interface layer can provide suitable abstraction for both the software and hardware blocks and yet offer high performance with low latency.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 shows a high-level multi-processor communication framework (MCF) for a computing device 100 comprising multiple processing nodes, in accordance with some embodiments. In this specification, processing nodes and processing units can be used interchangeably.

The computing device 100 may be implemented as a system-on-a-chip (SoC), multi-chip module (MCM), systems-in-package (SiP), systems-on-package (SoP), etc. The computing device 100 can be used in various applications that demand high performance and high-power efficiency, such as, smart home devices, virtual assistants, etc., and can support a wide range of use cases, e.g., audio, video, connectivity (e.g., Wi-Fi, Bluetooth), LEDs, sensors, networking, etc. The computing device 100 can also be used for other applications in various fields like home appliances, consumer electronics, automotive, industrial, telecommunications, medicine, aerospace, etc., that demand multi-processing nodes integrated in a device.

The computing device 100 may comprise a plurality of processing nodes including a first processing node 102, a second processing node 104, a third processing node 106, and a fourth processing node 108 that are coupled to an inter-processor communication (IPC) channel 110. Each of the first processing node 102, the second processing node 104, the third processing node 106, and the fourth processing node 108 may include an integrated circuit, such as, an application processor (AP), a microcontroller unit (MCU), a digital signal processor (DSP), an accelerator (e.g., a neural network accelerator, a cryptographic accelerator, a graphics processing unit (GPU)), etc. As an example, the first processing node 102 can be an AP, the second processing node 104 can be an MCU, the third processing node 106 can be a first DSP core, and the fourth processing node 108 can be a second DSP core. Each of the first processing node 102, the second processing node 104, the third processing node 106, and the fourth processing node 108 may communicate with one another using the MCF that is based on the TCP/IP layered architecture as shown in FIG. 1.

The MCF can be organized into an application layer, a transport layer, a network layer, and an IPC layer, similar to the TCP/IP layered architecture. The application layer may correspond to an application that can be serviced by the processing node. The transport layer may utilize a transport layer protocol such as the Transmission Control Protocol (TCP) or User Datagram Protocol (UDP). In some cases, the UDP may be used to transfer commands or signals, and the TCP may be used for the data transfer. The network layer may utilize a network layer protocol such as the Internet Protocol (IP). The IPC layer can facilitate the data transfer via the physical channel using appropriate physical bus protocols.

In some examples, the first processing node 102 may service a first application 102a, the second processing node 104 may service a second application 104a, a third processing node 106 may service a third application 106a, and a fourth processing node 108 may service a fourth application 108a based on the system specification, and exchange application data with one another via the IPC channel 110. The first application 102*a*, the second application 104*a*, the third application 106*a*, and the fourth application 108*a* may relate to audio, image processing, video, LED, networking, sensors, connectivity, etc. Each of the processing nodes 102, 104, 106, 108 may also support a respective transport layer, a network layer, and an IPC layer based on the MCF. For example, the first processing node 102 may support a transport layer 102*b*, a network layer 102*c*, and an IPC layer 102*d*, the second processing node 104 may support a transport layer 104*b*, a network layer 104*c*, and an IPC layer 104*d*, the third processing node 106 may support a transport layer 106*b*, a network layer 106*c*, and an IPC layer 106*d*, and the fourth processing node 108 may support a transport layer 108*b*, a network layer 108*c*, and an IPC layer 108*d*, based on the MCF.

In some embodiments, the computing device 100 may be assigned a network ID, which can be used for device-to-device communications. For each of the processing nodes 102, 104, 106, 108, the transport layer and the network layer may be used to specify the information associated with the source and destination for the data transfer as well as guide the IPC layer on how to handle the data using the appropriate headers. To support the transport layer connectivity, designated socket ports may be assigned for each of the application services supported by each of the processing nodes 102, 104, 106, 108. Each port may include a set of attributes that can provide access to endpoint characteristics, and state. For example, the attributes may be related to Quality of Service (QoS), buffers, timeouts, etc. The MCF can support standard socket APIs used for configuring the sockets and facilitating the data transfer, e.g., socket_ex, socket, socket_bind, socket_connect, socket_ioctl, socket_sendto, socket_recv, socket_accept, socket_listen, and socket_close, among others.

Furthermore, to support the network layer connectivity, each of the processing nodes 102, 104, 106, 108 may be assigned an IP address (e.g., an IPv4 address), that can be used to specify the sender and recipient processing nodes for routing the application data. The IP address assigned to a processing node may include the network ID associated with the computing device 100, and a host ID associated with the processing node. In some implementations, each of the network ID and the host ID can be 16 bits each, and the network ID can be 32 bits. The IPC layer can use the transport layer and the network layer headers to facilitate the data transfer through the IPC channel 110 using the appropriate bus protocol. The IPC channel 110 can provide the physical channel for the data transfer associated with the various applications, and may include an interconnect fabric, or one or more physical buses that can support various bus protocols, e.g., I2S, SPI, or PCIe. In some embodiments, the IPC channel 110 can be a shared memory that is used to facilitate communications among the processing nodes 102, 104, 106, 108.

In some embodiments, each of the processing nodes 102, 104, 106, 108 may have a plurality of sockets that can be assigned to respective application services. As an example, a socket can be assigned to an audio service, another socket can be assigned to an LED service, and another socket can be assigned to a sensor service. Furthermore, each of the plurality of sockets of a processing node may be associated with a logical port number.

Generally, the number of processing nodes in a computing device and/or number of computing devices may be known during the design phase. Therefore, the number of IP addresses that need to be assigned to each processing node may be known. In some implementations, static IP addresses may be assigned to each processing node during the design phase to support static routes for data transfer. Similarly, the number and type of service applications that can be supported by the computing device 100 may be known in advance. Therefore, the sockets and the ports can also be assigned during the design phase based on the application services. Accordingly, unlike the traditional TCP/IP framework, the MCF framework can utilize static assignments to reduce overhead and lower the memory requirements used to implement the protocol stack.

Some embodiments can support offloading certain processing tasks from one processing node to another processing node via the IPC channel 110 using a standard interface provided by the MCF. For example, to transfer application data associated with a service from a sender processing node to a destination port of a recipient processing node, a socket can be initialized by binding the socket to a source port at the sender processing node that is designated for the service. A transport protocol handshake can be performed between the sender processing node and the recipient processing node to establish a connection via the IPC channel 110. The sender processing node may generate a set of inter-processor packets associated with the application based on the MCF, and transfer the set of inter-processor packets to the recipient processing node via the IPC channel 110.

Some embodiments can support unicast, multicast, and broadcast features for inter-processor packets through a network addressing scheme. An inter-processor packet transfers data between processing nodes within an SoC. For unicast, a processing node may transfer an inter-processor packet to another processing node using a destination address of the target processing node. For multicast, a processing node may transfer an inter-processor packet comprising a multicast IP address that belongs to a multicast IP address range to a group of sockets associated with a set of processing nodes that are registered members of a multicast group. Each socket in the group of sockets may have been assigned a respective multicast IP address within the multicast IP address range to be able to support the multicast feature. In some embodiments, each processing node that wants to participate in the multicast can send a command to the sender processing node to register the processing node, and the sender processing node can send the inter-processor packet to the eligible or registered members having respective multicast IP addresses. For broadcast, a processing node may transfer an inter-processor packet with a specific broadcast IP address to all the sockets of the remaining processing nodes that are configured to support the broadcast feature.

Some embodiments can support zero-copy when the IPC channel 110 is a shared memory. The zero-copy can allow transferring the inter-processor packets by allocating space in the shared memory to a zero-copy buffer. A pointer to the zero-copy buffer can be provided to the IPC layer and a zero-copy flag can be set in the packet header to avoid having to copy the buffer data at the different layers of the protocol stack. Some embodiments can also support tunneling for transmitting the application data over the traditional IP networks by encapsulating each inter-processor packet as payload in a network packet. An example inter-processor packet is described with reference to FIG. 2.

Figure 2:
FIG. 2 shows an example inter-processor packet that has been encapsulated based on the MCF in accordance with some embodiments.

FIG. 2 shows an example inter-processor packet 200 that has been encapsulated based on the MCF in accordance with some embodiments.

The inter-processor packet 200 may include application data 200*a* that has been encapsulated with a MCF transport layer header 200*b* and an MCF network layer header 200*c*. The application data 200*a* may include payload containing a portion of the application data associated with a service, which is being transferred from a sender processing node to a recipient processing node. The MCF transport layer header 200*b* may include a source port of the sender processing node and a destination port of the recipient processing node. The MCF transport layer header 200*b* can be 20 bytes in length like the 20-bytes TCP header, or 8 bytes in length like the 8-bytes UDP header. The MCF network layer header 200*c* may include a source address being a static IP address of the sender processing node, and a destination address being a static IP address of the recipient processing node. The MCF network layer header 200*c* can be a pre-defined 20 bytes of header like the IPv4 header with 20 bytes.

Referring back to FIG. 1, the application data 200*a* may include the payload containing a portion of the application data associated with the first application 102*a* executing on the first processing node 102 which can offload the application data to the second processing node 104. As an example, the first application 102*a* may be an audio application that may be serviced by the second processing node 104. The transport layer 102*b* can be used to encapsulate the application data 200*a* with the MCF transport layer header 200*b* comprising a source port of the first processing node 102 that has been assigned to the audio application, and a destination port of the second processing node 104 that has been assigned to the audio application. The network layer 102*c* can be used to further encapsulate the application data 200*a* already encapsulated with the MCF transport layer header 200*b* with the MCF network layer header 200*c* comprising a first IP address assigned to the first processing node 102, and a second IP address assigned to the second processing node 104. The first IP address and the second IP address can be static IP addresses.

In some examples, the inter-processor packet 200 can include a multicast IP address that belongs to a multicast IP address range. As an example, a group of sockets can register to be members of a multicast group and be assigned a respective multicast IP address within the multicast IP address range. The group of sockets may include a socket from each of the processing nodes 102, 104, 106, 108. The multicast IP address can be the destination address in the MCF network layer header 200*c*. In some examples, the inter-processor packet 200 can include a specific broadcast IP address that is broadcasted to all the sockets of the processing nodes 102, 104, 106, 108 that are configured to support the broadcast feature.

In some examples, the inter-processor packets may need to be transmitted to another device over a network that may also support the MCF and can decode the MCF headers. In such cases, the inter-processor packets may be encapsulated as a payload with another transport layer header and network layer header for transmitting over a network as network packets. For example, as shown in FIG. 2, the inter-processor packet 200 can be used as a payload for a network packet 202 which includes the inter-processor packet 200 data as network packet payload 202*a*. The network packet 202 may also include a transport layer header 202*b* and a network layer header 202*c* encapsulating the network packet payload 202*a*. The transport layer header 202*b* and the network layer header 202*c* can be based on the traditional TCP/IP stack of the IP suite.

Figure 3:
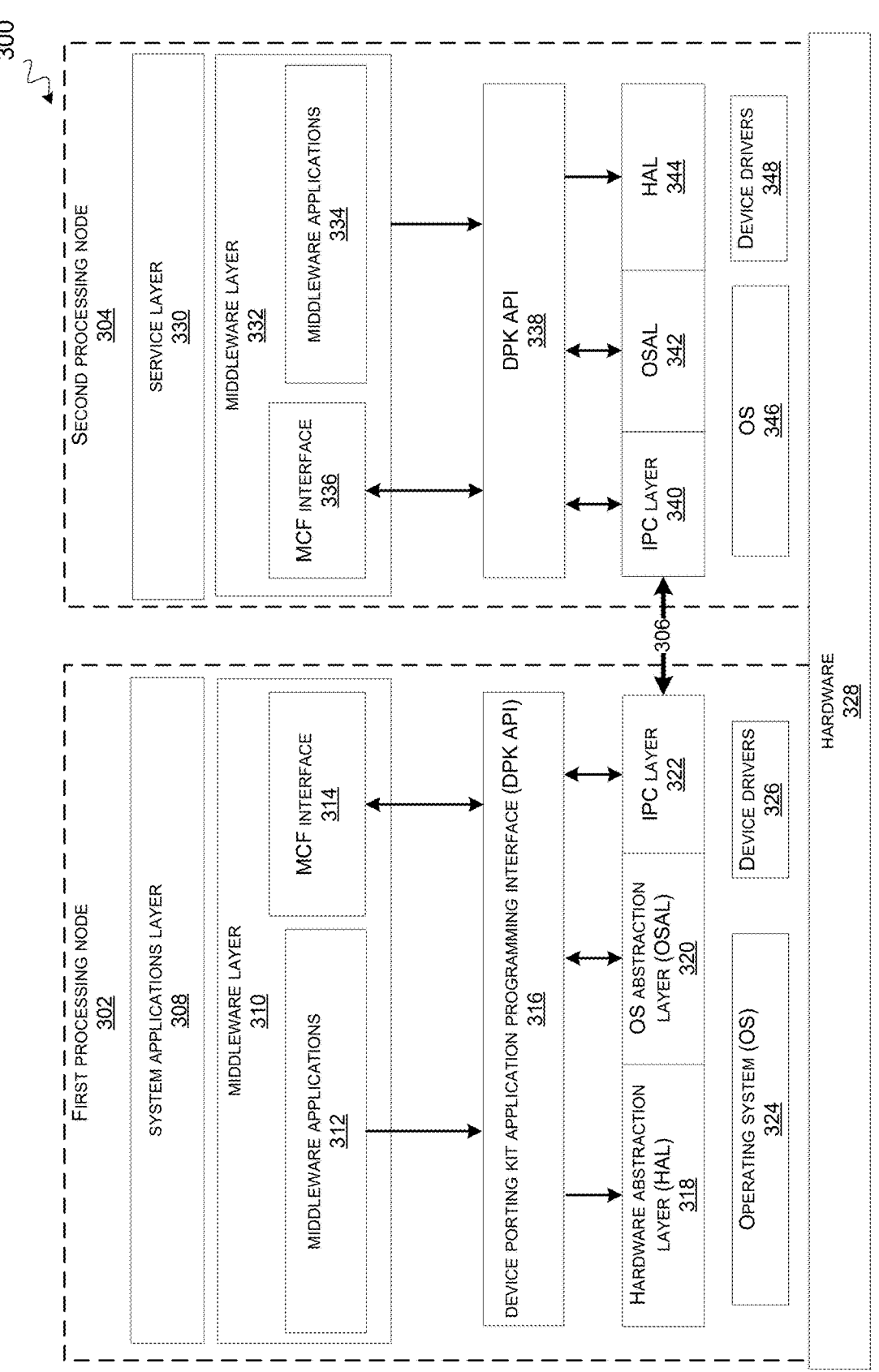
FIG. 3 shows a high-level layered architecture with the MCF for an apparatus comprising two processing nodes, in accordance with some embodiments.

FIG. 3 shows a high-level layered architecture with the MCF for an apparatus 300 comprising two processing nodes, in accordance with some embodiments. As an example, the apparatus 300 can be part of the computing device 100 of FIG. 1.

A first processing node 302 and a second processing node 304 may be configured to support a layered architecture based on the MCF to communicate via an IPC channel 306. For example, the first processing node 302 can be the first processing node 102 and the second processing node 304 can be the second processing node 104. The apparatus 300 may include hardware 328 that can support execution of an operating system (OS) 324 and device drivers 326 for the first processing node 302, and an OS 346 and device drivers 348 for the second processing node 304. The OS 324 and the OS 346 can be Linux, or Free RTOS, among other examples. A hardware abstraction layer (HAL) 318 and HAL 344 can provide programming interfaces to access the underlying hardware 328 (e.g., LED, button, power, security, etc.) at an abstract level. An OS abstraction layer (OSAL) 320 and OSAL 342 can provide a set of interfaces for the OS services including threads, mutex, timers, sockets, etc., at an abstract level. An IPC layer 322 can be similar to the IPC layer 102*d*, and an IPC layer 340 can be similar to the IPC layer 104*d*. The IPC layer 322 and the IPC layer 340 can be used to provide communication between the first processing node 302 and the second processing node 304 via the IPC channel 350.

The layered architecture based on the MCF for the first processing node 302 may include a system applications layer 308 that interfaces with a middleware layer 310 and an MCF interface 314. The system applications layer 308 may include a plurality of device level applications and/or software development kits (SDKs) associated with different features supported by the computing device. The middleware layer 310 may include middleware applications 312, e.g., an audio manager, a sensor manager, a networking manager, an LED manager, a connectivity manager, etc., associated with different device features. The MCF interface 314 can provide a plurality of socket APIs based on the TCP/IP layered architecture described with reference to FIG. 1 that can be called by the middleware applications 310 to perform data transfer with the second processing node 304 over the IPC channel 306.

In some implementations, a device porting kit (DPK) API 316 can interface with the middleware applications 312, the MCF interface 314, the HAL 318, the OSAL 320, and the IPC layer 322. The DPK API 316 can provide support for communication within the same processing node or between different processing nodes. For example, in some cases, some of the processing tasks may be performed on the same processing node, and some other processing tasks may be offloaded to the other processing node via the IPC channel 306. The IPC channel 306 may include different types of physical channels for different types of bus protocols used by different services. When some of the processing tasks are to be offloaded to the second processing node 304, the MCF interface 314 may call the IPC APIs, which may vary for different types of the IPC channel 306. However, the DPK API 316 can provide a standard interface to the IPC layer 322 that can allow supporting different types of physical channels.

In some examples, the second processing node 304 may be operable to execute a service layer 330 that interfaces with an MCF interface 336. A middleware layer 332 may include middleware applications 334. The middleware applications 334 and the MCF interface 336 may interface with the IPC layer 340, the OSAL 342, and the HAL 344 via a DPK API 338. The DPK API 338 and the middleware applications 334 may be optional in some implementations.

Figure 4:
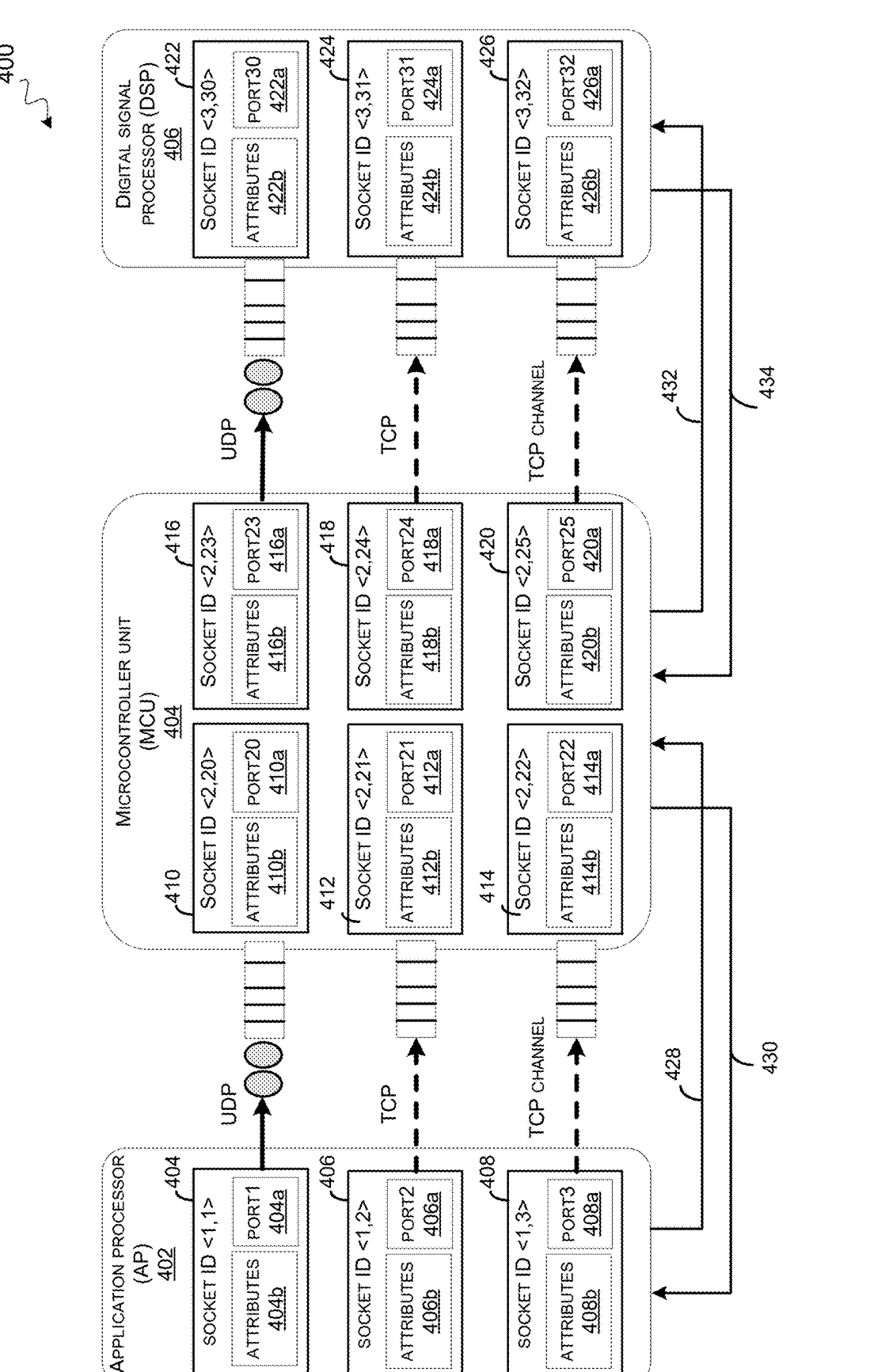
FIG. 4 shows an example of the communication between multiple processing nodes in an apparatus based on the MCF, in accordance with some embodiments.

FIG. 4 shows an example of the communication between multiple processing nodes in an apparatus 300 based on the MCF, in accordance with some embodiments. For example, the apparatus 300 can be part of the computing device 100 in FIG. 1.

The apparatus 300 may include an AP 402, an MCU 404, and a DSP 406, which may be examples of the first processing node 102, the second processing node 104, and the third processing node 106, respectively. The AP 402 may communicate with the MCU 404 via an IPC channel 428 and an IPC channel 430 based on the MCF. The MCU 404 may communicate with the DSP 406 via an IPC channel 432 and an IPC channel 434 based on the MCF. The IPC channel 428, the IPC channel 430, the IPC channel 432 and/or the IPC channel 434 may include a physical bus based on SPI, I2S, PCIe, etc., an interconnect fabric, or a shared memory.

In some embodiments, a first IP address (e.g., represented as "1" in FIG. 4) may be assigned to the AP 402, a second IP address (e.g., represented as "2") may be assigned to the MCU 404, and a third IP address (e.g., represented as "3") may be assigned to the DSP 406. It should be noted that the actual IP address can have a format similar to an IP address, e.g., an IPv4 address, and can include a network ID and a host ID. Within each processing nodes, designated socket ports may be assigned for each of the application use cases or services, and each socket port may include a set of attributes that can provides access to endpoint characteristics, and state. These attributes may be related to QoS, buffers, timeouts, etc. Each socket can be identified by a socket ID<IP address, port number>. Within the AP 402, a socket 404 may be assigned a first application service, a socket 406 may be assigned a second application service, and a socket 408 may be assigned a third application service. Within the MCU 404, a socket 410 may be assigned the first application service, a socket 412 may be assigned the second application service, a socket 414 may be assigned the third application service, a socket 416 may be assigned a fourth application service, a socket 418 may be assigned a fifth application service, and a socket 420 may be assigned a sixth application service. Within the DSP 406, a socket 422 may be assigned the fourth application service, a socket 424 may be assigned the fifth application service, and a socket 426 may be assigned the sixth application service. In some examples, more than one sockets can be assigned the same application service.

As shown in FIG. 4, the socket 404 may include a port1 404a with attributes 404b, and can be identified by a socket ID<1,1> that corresponds to the IP address being "1" and the port number being "1." The socket 406 may include a port2 406a with attributes 406b, and can be identified by a socket ID<1,2> that corresponds to the IP address being "1" and the port number being "2." The socket 408 may include a port3 408a with attributes 408b, and can be identified by a socket ID<1,3> that corresponds to the IP address being "1" and the port number being "3."

The socket 410 may include a port20 410a with attributes 410b, and can be identified by a socket ID<2,20> that corresponds to the IP address being "2" and the port number being "20." The socket 412 may include a port21 412a with attributes 412b, and can be identified by a socket ID<2,21> that corresponds to the IP address being "2" and the port number being "21." The socket 414 may include a port22 414a with attributes 414b, and can be identified by a socket ID<2,22> that corresponds to the IP address being "2" and the port number being "22."

The socket 416 may include a port23 416a with attributes 416b, and can be identified by a socket ID<2,23> that corresponds to the IP address being "2" and the port number being "23." The socket 418 may include a port24 418a with attributes 418b, and can be identified by a socket ID<2,24> that corresponds to the IP address being "2" and the port number being "24." The socket 420 may include a port25 420a with attributes 420b, and can be identified by a socket ID<2,25> that corresponds to the IP address being "2" and the port number being "25."

The socket 422 may include a port30 422a with attributes 422b, and can be identified by a socket ID<3,30> that corresponds to the IP address being "3" and the port number being "30." The socket 424 may include a port31 424a with attributes 424b, and can be identified by a socket ID<3,31> that corresponds to the IP address being "3" and the port number being "31." The socket 426 may include a port32 426a with attributes 426b, and can be identified by a socket ID<3,32> that corresponds to the IP address being "3" and the port number being "32."

In some examples, the first application service can be an audio manager that can initialize the socket 404 and the socket 410 to establish a UDP connection between the port1 404a and the port20 410a upon receiving a command from a system application for transfer of audio stream. For example, the audio manager can be part of the middleware applications 312 that is executing on the AP 402, and may establish the UDP connection using the MCF interface 314 to offload some of the processing to the MCU 404 via the IPC layer 322 over the IPC channel 306. As an example, the IPC channels 428 and 430 can be examples of the IPC channel 306.

In some examples, the second application service can be an LED manager that can initialize the socket 406 and the socket 412 to establish a TCP connection between the port2 406a and the port21 412a. For example, the LED manager can be part of the middleware applications 312 that is executing on the AP 402, and may setup the TCP connection using the MCF interface 314 to offload some of the processing to the MCU 404 via the IPC layer 322 over the IPC channel 306. Note that establishing the TCP connection may include performing a TCP handshake between the AP 402 and the MCU 404.

In some examples, the third application service can be a sensor manager that can initialize the socket 408 and the socket 414 to establish a TCP connection between the port3 408a and the port22 414a. For example, the sensor application can be part of the middleware applications 312 that is executing on the AP 402, and may setup the TCP connection using the MCF interface 314 to offload some of the processing to the MCU 404 via the IPC layer 322 over the IPC channel 306.

Similarly, the MCU 404 may be operable to offload some of the processing tasks associated with certain application services executing on the MCU 404 to the DSP 406 by establishing UDP and/or TCP connections between the corresponding ports for data transfer over the IPC channels 432 and 434. For example, the fourth, fifth, or sixth application services can be an audio manager, an LED manager, a sensor manager, or a connectivity manager. The data transfer can be performed by calling socket APIs described with reference to FIG. 5.

FIG. 5 shows a table 500 comprising examples of a socket API 502 used by the MCF, and its description 504.

Each socket API 502 may be similar to the socket APIs that are based on the TCP/IP architecture. By using socket APIs based on the traditional TCP/IP architecture, the development time and overhead for implementing MCF can be reduced, because it is not necessary to design completely new socket APIs to support the inter-processor node communications. Each socket API 502 can be part of the MCF interface 314 and the MCF interface 336, and can be called by the applications to facilitate the data transfer over the IPC channel. Examples of the socket API 502 include a MCF_socket_ex 502a, MCF_socket 502b, MCF_socket_bind 502c, MCF_socket_connect 502d, MCF_socket_ioct1 502e, MCF_socket_sendto 502f, MCF_socket_recv 502g, MCF_socket_accept 502h, MCF_socket_listen 502i, and MCF_socket_close 502j.

The MCF_socket_ex 502a can be used to create a socket that binds to a specific interface. The MCF_socket 502b can be used to create a socket but it is bound to a default interface. In this case, the application can add routes in order to route the data through a specific interface. The MCF_socket_bind 502c can be used to associate and reserve a port for use by a socket. Each of the application service binds to the designated ports. The MCF_socket_connect 502d can be used by the sender processing node to establish a connection with the recipient processing node. The MCF_socket_ioct1 502e can be used to configure the socket or network layers. The MCF_socket_sendto 502f can be used to send data to the designated network address/port. The MCF_socket_recv 502g can be used to receive data on the bound port. The MCF_socket_accept 502h can be used by the recipient processing node to get a socket for an incoming client connection from the sender processing node. The MCF_socket_listen 502i can be used to instruct TCP protocol implementation to listen for connections. The MCF_socket_close 502j can be used to close the socket.

Note that the embodiments can support other standard socket APIs or functions as well that are not described herein. In some examples, setsocketopt( ) and getsocketopt( ) can be used to designate a set of sockets to a group that supports certain functionalities. For example, a group of sockets can be assigned respective IP address to support multicast or broadcast, and added as members to be designated to receive multicast or broadcast transfers for each processing node. The MCF_socket_sendto 502f can be used to send the data to multiple processing nodes based on the corresponding memberships.

Figure 6:
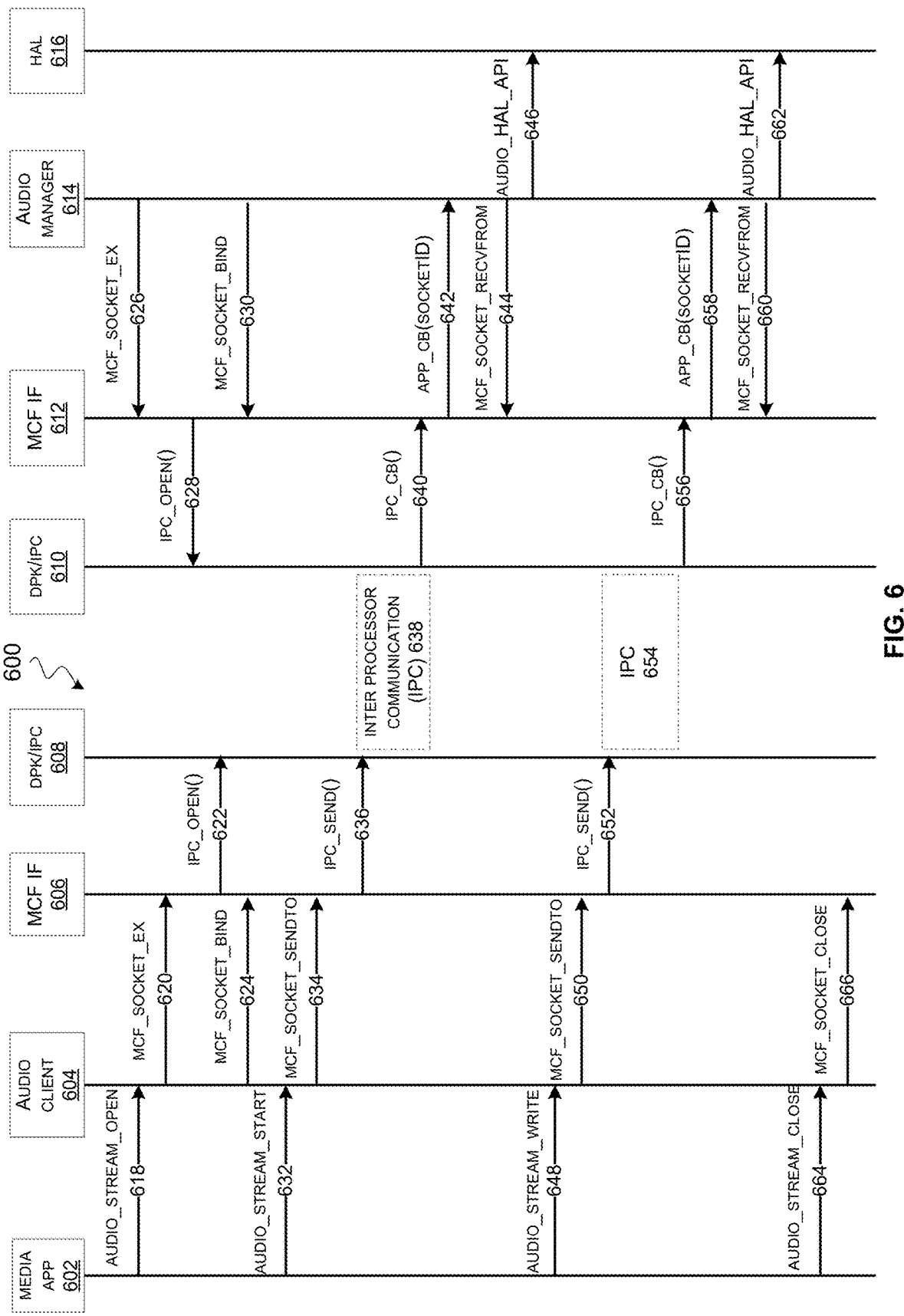
FIG. 6 shows an example communication flow for data transfer between two processing nodes using MCF based on an UDP connection, according to some embodiments.

FIG. 6 shows an example communication flow 600 for data transfer between two processing nodes using MCF based on an UDP connection, according to some embodiments. As an example, the data transfer may be performed for audio playback from the first processing node 302 to the second processing node 304 in FIG. 3. The first processing node 302 and the second processing node 304 may be aware that the data transfer may be performed using the UDP connection.

As an example, a media app 602 can be a system application in the system applications layer 308, an audio client 604 can be one of the middleware applications 312, a MCF IF 606 can be the MCF interface 314, and a DPK/IPC 608 can be the DPK API 316/IPC layer 322. A DPK/IPC 610 can be the DPK API 338/IPC layer 340, a MCF IF 312 can be the MCF interface 336, an audio manager 614 can be one of the middleware applications 334, and a HAL 616 can be the HAL 344. In some examples, the first processing node 302 can be the MCU 404 and the second processing node 304 can be the DSP 406 in FIG. 4. An audio stream can be opened and then streamed continuously.

As shown in FIG. 6, the media app 602 executing on the MCU 404 may send an audio_stream_open command 618 to open an audio stream for audio playback. A UDP socket can be created on the MCU 404 using a MCF_socket_ex API 620 and bound to a designated port using a MCF_socket_bind API 624 to be used for an audio application. On the DSP 406, a UDP socket can be created and bound to a port as part of an initialization thread using a MCF_socket_ex API 626 and a MCF_socket_bind API 630. As an example, the MCF IF 606 may bind the audio application to the port23 416a on the MCU 404, and the MCF IF 612 can bind the audio service to the port30 422a on the DSP 406. The MCF IF 606 and the MCF IF 612 may call IPC_open( ) 622 and IPC_open( ) 628, respectively, to open and configure the IPC channel 306 for the data transfer for audio playback.

The media app 602 may send an audio_stream_start command 632 to the audio client 604 to start transferring the audio stream data for playback. A MCF_socket_sendto API 634 can be called to send the audio stream data to a remote port designated as an audio port (e.g., port30 422a on the DSP 406). The MCF IF 606 may call a handler IPC_send( ) 636 to start sending the audio stream data. The DPK/IPC 608 may send the audio stream data via the IPC 638 to the DPK/IPC 610. The DPK/IPC 610 may call a handler IPC_CB( ) 640 to the MCF IF 612 indicating that data has been received at a port. The MCF IF 612 may decode the transport layer and the network layer headers to determine that this port is a local port that is designated as an audio port. The MCF IF 612 may determine that this audio port is registered by the audio manager 614 and may call a handler app_cb(socketID) 642 to the audio manager 614. The audio manager 614 may call a MCF_socket_recv-from 644 to receive the audio stream data. The audio manager 614 may call the HAL 616 via an audio_HAL_API 646 to play that audio stream data. Thus, the audio stream data may be transferred from the MCU 404 to the DSP 406 via the IPC communication 638.

In some cases, audio stream data can be written to the DSP 406 via the IPC channel 306. For example, the media app 602 may send an audio_stream_write command 648 to the audio client 604. The audio client 604 may communicate with the MCF IF 606 via a MCF_socket_sendto API 650. The MCF IF 606 may call a handler IPC_send( ) 652 to write the audio stream data. The DPK/IPC 608 may send the audio stream data via an IPC 654 to the DPK/IPC 610. The DPK/IPC 610 may call a handler IPC_CB( ) 656 to the MCF IF 612 indicating that data has been received at a port. The MCF IF 612 may decode the transport layer and the network layer headers to determine that this port is a local port that is designated as an audio port. The MCF IF 612 may determine that this audio port is registered by the audio manager 614 and may call a handler app_cb(socketID) 658 to the audio manager 614. The audio manager 614 may call a MCF_socket_recvfrom 660 to receive the audio stream data. The audio manager 614 may call the HAL 616 via an audio_HAL_API 662 to store that audio stream data. Thus, the audio stream data may be transferred from the MCU 404 to the DSP 406 via the IPC 654. The media app 602 may the send an audio_stream_close command 664. The audio client 604 may communicate with the MCF IF 606 via a MCF_socket_close API 666 for the MCF IF 606 to close the UDP socket.

Figure 7:
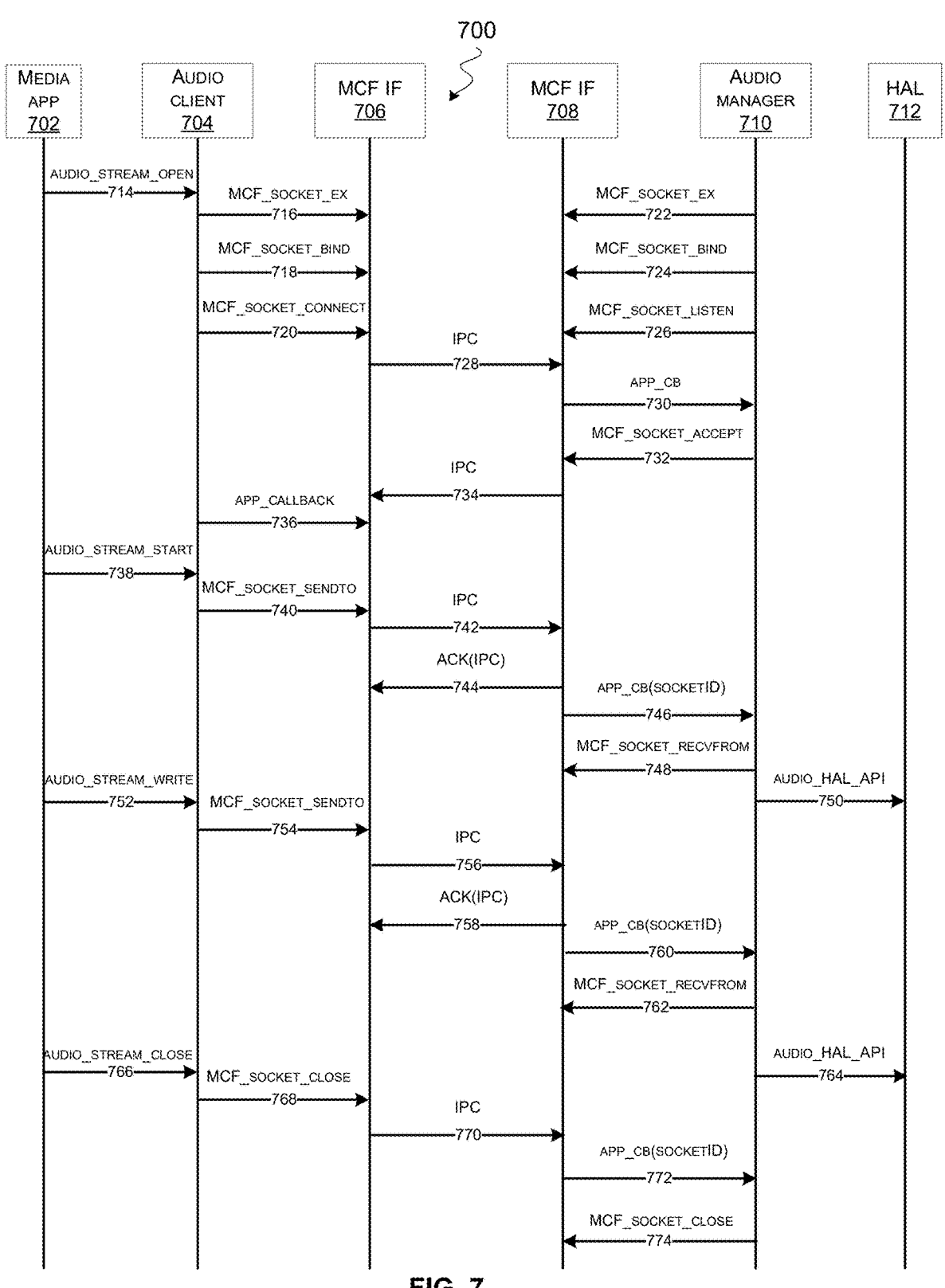
FIG. 7 shows an example communication flow for data transfer between two processing nodes using MCF based on a TCP connection, according to some embodiments.

FIG. 7 shows an example communication flow 700 for data transfer between two processing nodes using MCF based on a TCP connection, according to some embodiments. As an example, the data transfer may be performed for audio playback from the first processing node 302 to the second processing node 304 in FIG. 3. The first processing node 302 and the second processing node 304 may be aware that the data transfer may be performed using the TCP connection.

Like FIG. 6, a media app 702 can be a system application in the system applications layer 308, an audio client 704 can be one of the middleware applications 312, and a MCF IF 706 can be the MCF interface 314. A MCF IF 708 can be the MCF interface 336, an audio manager 710 can be one of the middleware applications 334, and a HAL 712 can be the HAL 344. In some examples, the first processing node 302 can be the MCU 404 and the second processing node 304 can be the DSP 406 in FIG. 4. An audio stream can be opened and then streamed continuously.

As described with reference to FIG. 6, the media app 702 may send an audio_stream_open command 714 to open an audio stream for audio playback. A MCF_socket_ex 716 and a MCF_socket_bind 718 APIs may be called by the audio client 704 on the MCU 404 to create a socket and bind a port to be used by that socket for an audio application. Similarly, a MCF_socket_ex 722 and a MCF_socket_bind 724 APIs may be called by the audio manager 710 on the DSP 406 to create a socket and bind a port to be used by that socket for an audio service. As an example, the MCF IF 706 may bind the audio application to the port24 418a on the MCU 404, and the MCF IF 708 can bind the audio service to the port31 424a on the DSP 406. A MCF_socket_listen API 726 may be called to transition to the listen state and wait for the connection request from the MCU 404.

In some implementations, a TCP handshake may be performed with the DSP 406 to establish a connection between the DSP 406 and the MCU 404. For example, a MCF_socket_connect 720 API may be called to establish a TCP connection. The connection request may be sent to the MCF IF 708 via IPC 728. The MCF IF 708 may call an app_cb 730 to the audio manager 710 with the connection request. The audio manager 710 may accept the connection request using a MCF_socket_accept API 732. The accept response may be transferred to the MCF IF 706 via IPC 734. The MCF IF 706 may receive an app_callback 736 once the connection request is accepted by the audio manager 710. The audio client 704 may be aware that the connection has been established and inform the media app 702 to start the data transfer.

An audio_stream_start API 738 may be used to start playing the audio start continuously for a certain time duration (e.g., 2 minutes). During this time duration, the audio client 704 may call a MCF_socket_sendto API 740 multiple times to transfer portions of the audio stream data via the IPC channel 306. For example, as described with reference to FIG. 6, each portion of the audio stream data may be transferred to the MCF IF 708 via IPC 742, and a corresponding ACK(IPC) 744 may be received in response. The MCF IF 708 may determine that this audio port is registered by the audio manager 710 and may call a handler app_cb(socketID) 746 to the audio manager 710. The audio manager 710 may call a MCF_socket_recvfrom 748 to receive the audio stream data. The audio manager 710 may call the HAL 712 via an audio_HAL_API 750 to play that audio stream data. Thus, each portion of the audio stream data may be transferred from the MCU 404 to the DSP 406 via the IPC communication 742.

An audio_stream_write command 752 can be sent by the media app 702, and handled in the similar manner as described with reference to FIG. 6. For example, the audio client 704 may call a MCF_socket_sendto API 754. The data transfer may be performed via IPC 756 and a corresponding ACK(IPC) 758 may be received in response. The MCF IF 708 may call a handler app_cb(socketID) 760 to the audio manager 710. The audio manager 710 may call an MCF_socket_recvfrom 762 to receive the audio stream data. The audio manager 710 may call the HAL 712 via an audio_HAL_API 764 to store that audio stream data. Thus, the audio stream data may be transferred from the MCU 404 to the DSP 406 via the IPC 756.

In some examples, the recipient socket may be closed and return a "closed event" in response to the MCF_socket_ sendto API 754. For example, the ACK(IPC) 758 may indicate that the recipient side was closed abnormally. In this case, the media app 702 may close a socket. For example, the media app 702 may the send an audio_stream_close command 706. The audio client 704 may call a MCF_sock-et_close API 768. The close command may be transferred to the MCF 708 via an IPC 770. The MCF IF 708 may call a handler app_cb(socketID) 772 to the audio manager 710. The audio manager 710 may call a MCF_socket_close 774 to close the socket.

Thus, as described with reference to FIG. 6 and FIG. 7, the standard APIs can be used to facilitate communication between two processing nodes via an IPC channel based on the MCF.

FIG. 8 illustrates a flow chart 800 for a method for inter-processor communication within an SoC, according to some embodiments. As an example, the SoC can be the computing device 100 and the inter-processor communication can be performed between the second processing node 104 and the third processing node 106. In some embodiments, each of the processing nodes in the computing device 100 may be assigned a respective static IP address. Additionally, each of the processing nodes may have a plurality of sockets that can be assigned to respective application services.

In step 802, the method may include initializing a socket at a sender processing node to transfer application data associated with a service to a destination port of a recipient processing node by binding the socket to a source port at the sender processing node designated for the service. For example, the sender processing node can be the MCU 404, which may be an example of the second processing node 104, and the recipient processing node can be the DSP 406, which may be an example of the third processing node 106. As described with reference to FIG. 4, initializing the socket may include binding the socket to the port24 418a on the MCU 404 designated for the audio service to transfer the audio stream data to the port31 424a in the DSP 406.

In step 804, the method may include performing a transmission control protocol handshake with the recipient processing node to establish a connection between the sender processing node and the recipient processing node in the SoC. As described with reference to FIG. 4, a TCP handshake may be performed to establish a connection between the MCU 404 and the DSP 406.

In step 806, the method may include generating a set of inter-processor packets that each include a source address being a static IP address of the sender processing node, a destination address being a static IP address of the recipient processing node, a transmission control protocol header including the source port of the sender processing node and the destination port of the recipient processing node, and a payload containing a portion of the application data. For example, each inter-processor packet in the set of inter-processor packets may be similar to the inter-processor packet 200. The application data 200a may correspond to the payload associated with a portion of the audio stream. The MCF transport layer header 200b may include the port24 418a of the MCU 404 as the source port, and the port31 424a as the destination port of the DSP 406. The MCF network layer header 200c may include "2" as the source address of the MCU 404 and "3" as the destination address of the DSP 406.

In step 808, the method may include providing the set of inter-processor packets to an inter-processor communication channel that transfers the set of inter-processor packets to the recipient processing node. As described with reference to FIG. 7, the set of inter-processor packets corresponding to the portions of the audio stream data may be transferred via the IPC 742.

The MCF described herein provides a power-saving architecture that can be used for inter-processor communication without certain limitations of the TCP/IP architecture. The MCF supports static routes using pre-defined contents for the transport layer and network layer headers, which can minimize the overhead stemming from dynamic rules that are needed to alter the routes for the standard TCP/IP architecture. The MCF also has low memory requirements as compared to the TCP/IP since the MCF uses limited number of ports and does not have to maintain huge hash tables to support data transfers via UDP/TCP ports. The MCF can also save on memory usage by truncating requirements for IP security and TLS support.

In some implementations, the MCF can allow using the shared memory for allocating buffer space as compared to the TCP/IP architecture that has to maintain its own memory pool to send/receive packets from the network. Furthermore, the TCP layer in the TCP/IP architecture handles lot of timers to handle network delays and packet loss requirements, which may not be needed in the MCF since the network delays are negligible for inter-processor communication, and the IPC can handle the packet loss functionality. Thus, the MCF provides low memory footprint and has minimal timers' requirements, which can be beneficial in embedded systems since it can implement a low memory permanent stack without unnecessary hash tables, databases, or timers.

The MCF can provide a light-weight framework in addition to taking care of routing protocol, reliability, QoS, and buffer management. The MCF can provide flexibility and portability across various platforms since the data transfer is performed by the underlying hardware resources. Having a standard framework can help overcome the difficulties in integrating or porting to various platforms without compromising the performance. The MCF can scale to different communication models like processor-to-processor, sensor-to-sensor, or device-to-device communications.

Figure 9:
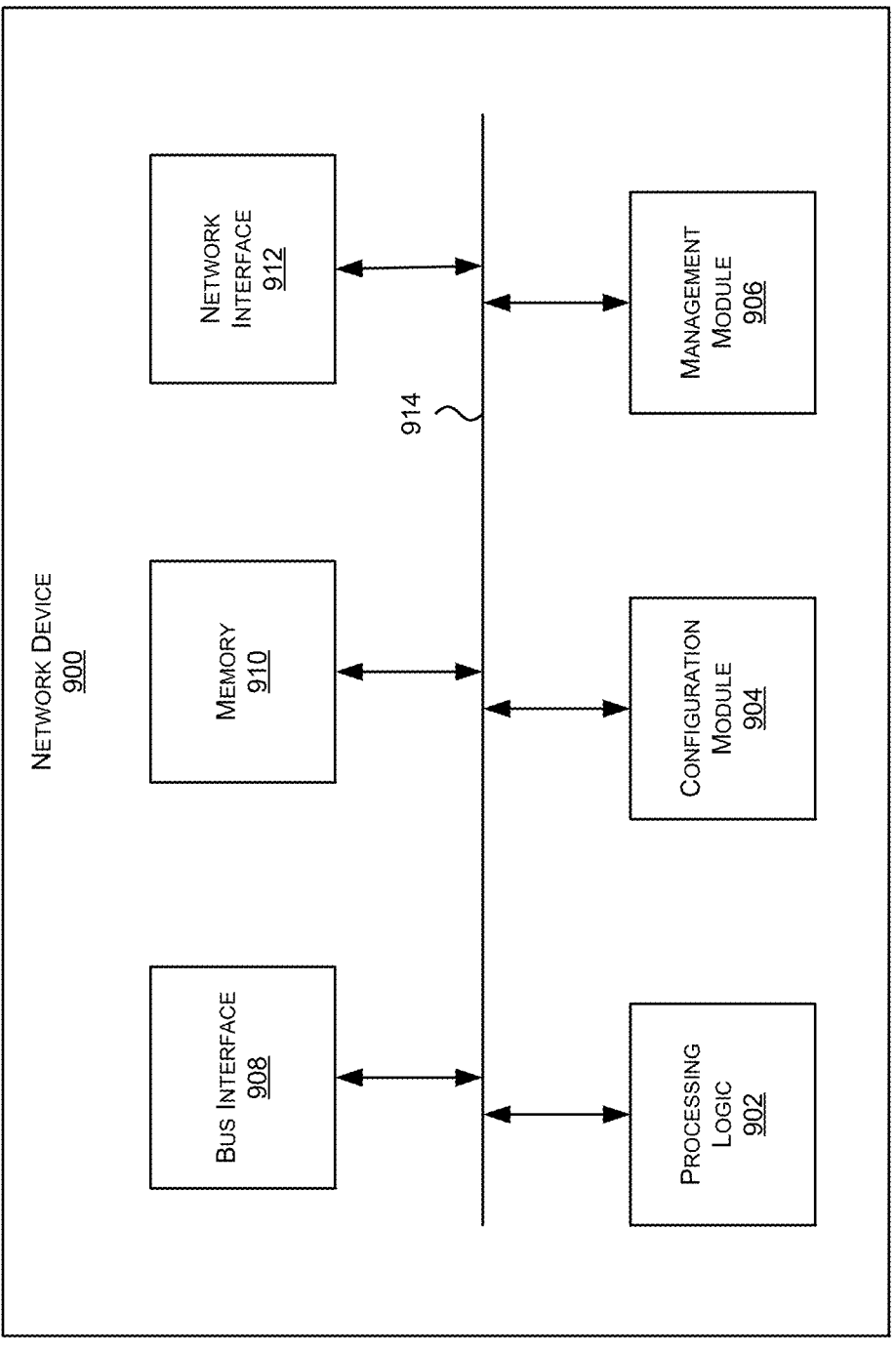
FIG. 9 illustrates an example of a computing device, according to certain aspects of the disclosure.

FIG. 9 illustrates an example of a computing device 900. Functionality and/or several components of the computing device 900 may be used without limitation with other embodiments disclosed elsewhere in this disclosure, without limitations. For example, the computing device 900 can be one of the processing nodes described with reference to previous figures. A computing device 900 may facilitate processing of packets and/or forwarding of packets from the computing device 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 900 may be the recipient and/or generator of packets. In some implementations, the computing device 900 may modify the contents of the packet before forwarding the packet to another device. The computing device 900 may be a peripheral device coupled to another computer device, a switch, a router or any other suitable device enabled for receiving and forwarding packets.

In one example, the computing device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computing device 900 may include additional modules, which are not illustrated here. In some implementations, the computing device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM©, MIPS©, AMD©, Intel©, Qualcomm©, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computing device 900, while in other cases some or all of the memory may be external to the computing device 900. The memory 910 may store an operating system comprising executable instructions that, when executed by the processing logic 902, provides the execution environment for executing instructions providing networking functionality for the computing device 900. The memory may also store and maintain several data structures and routing tables for facilitating the functionality of the computing device 900.

In some implementations, the configuration module 904 may include one or more configuration registers. Configuration registers may control the operations of the computing device 900. In some implementations, one or more bits in the configuration register can represent certain capabilities of the computing device 900. Configuration registers may be programmed by instructions executing in the processing logic 902, and/or by an external entity, such as a host device, an operating system executing on a host device, and/or a remote device. The configuration module 904 may further include hardware and/or software that control the operations of the computing device 900.

In some implementations, the management module 906 may be configured to manage different components of the computing device 900. In some cases, the management module 906 may configure one or more bits in one or more configuration registers at power up, to enable or disable certain capabilities of the computing device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an Infiniband network, etc.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for inter-processor communication within a system-on-a-chip (SoC), the method comprising:

initializing a socket at a sender processing node within the SoC to transfer application data associated with a service to a recipient processing node within the SoC by binding the socket to a source port that is designated for the service at the sender processing node;

performing a transmission control protocol handshake with the recipient processing node to establish a connection between the sender processing node and the recipient processing node in the SoC;

generating a set of inter-processor packets that each include a source address that is a static Internet Protocol (IP) address of the sender processing node, a destination address that is a static IP address of the recipient processing node, a first transmission control protocol header used for inter-processor communications within the SoC and including the source port of the sender processing node and a destination port of the recipient processing node, and a payload containing a portion of the application data;

providing the set of inter-processor packets to an inter-processor communication channel that transfers the set of inter-processor packets to the recipient processing node within the SoC; and generating a network packet having a second transport protocol layer header that encapsulates an entire inter-processor packet as payload to transmit the payload to an external component on a network.

2. The method of claim 1, further comprising:

generating a multicast inter-processor packet that includes a destination address that is a multicast IP address belonging to a multicast IP address range; and providing, via the inter-processor communication channel, the multicast inter-processor packet to a set of recipient processing nodes within the SoC, wherein each recipient processing node in the set of recipient processing nodes is assigned a respective multicast IP address within the multicast IP address range.

3. The method of claim 1, wherein the sender processing node and the recipient processing node are heterogenous processing nodes including at least one of an application processor, a digital signal processor, a microcontroller unit, or a computational accelerator.

4. The method of claim 1, wherein the inter-processor communication channel includes a shared memory that supports zero-copy.

5. A computing device comprising:

a system-on-chip (SoC) including:

a plurality of processing nodes within the SoC; and an inter-processor communication channel within the SoC coupling the plurality of processing nodes, wherein each of the plurality of processing nodes within the SoC is associated with an Internet Protocol (IP) address, wherein each of the plurality of processing nodes within the SoC communicates with each other via the inter-processor communication channel using inter-processor packets, each of the inter-processor packets having a first IP address identifying a sender processing node, a second IP address identifying a recipient processing node, a first transport protocol layer header used for inter-processor communications within the SoC, and a data payload, and wherein communication of an inter-processor packet is performed by selecting between transmitting the inter-processor packet on the inter-processor communication channel when the inter-processor packet is being communicated to another processing node within the SoC, and encapsulating the inter-processor packet as payload in a network packet having a second transport protocol layer header when communicating the inter-processor packet to an external component on a network.

6. The computing device of claim 5, wherein the first IP address and the second IP address are static IP addresses.

7. The computing device of claim 5, wherein each of the plurality of processing nodes has a plurality of sockets that are assignable to respective application services, and each of the plurality of sockets of a processing node is associated with a logical port number, and wherein the logical port number is provided in the first transport protocol layer header of the inter-processor packet to identify an application service associated with the inter-processor packet within the SoC.

8. The computing device of claim 5, wherein the computing device is operable to multicast a multicast inter-processor packet to multiple processing nodes within the SoC by providing the multicast inter-processor packet with a multicast IP address belonging to a multicast IP address range to a group of sockets including a socket from each of the multiple processing nodes.

9. The computing device of claim 5, wherein the inter-processor communication channel includes a shared memory, and the plurality of processing nodes is operable to transfer one or more inter-processor packets within the SoC by allocating space in the shared memory to a zero-copy buffer.

10. The computing device of claim 5, wherein the first transport protocol layer header of the inter-processor packets being transferred within the SoC has a format resembling a transmission control protocol (TCP) header or a user datagram protocol (UDP) header.

11. A system-on-a-chip (SoC) comprising:

an inter-processor communication channel within the SoC;

a processing unit within the SoC and coupled to the inter-processor communication channel; and a memory coupled to the processing unit and storing code which, when executed by the processing unit, causes the processing unit to perform operations including:

initializing a socket to transfer data associated with a service to a destination processing unit via the inter-processor communication channel by binding the socket to a logical port designated for the service; and generating an inter-processor packet that includes a first transport protocol layer header used for inter-processor communications within the SoC, and a payload containing the data, wherein communication of the inter-processor packet is performed by selecting between providing the inter-processor packet to the inter-processor communication channel when communicating the inter-processor packet to to a destination within the SoC, and encapsulating the inter-processor packet as payload in a network packet having a second transport protocol layer header when communicating the inter-processor packet to an external component on a network.

12. The SoC of claim 11, wherein the inter-processor packet further includes a network layer header comprising a first static IP address associated with the processing unit, and a second static IP address associated with the destination processing unit.

13. The SoC of claim 11, wherein the operations further include performing a protocol handshake with the destination processing unit to establish a connection before providing the inter-processor packet to the inter-processor communication channel.

14. The SoC of claim 11, wherein the inter-processor communication channel includes a shared memory that supports zero-copy data transfer.

15. The SoC of claim 11, wherein the operations include generating a multicast inter-processor packet that includes a multicast IP address belonging to a multicast IP address range to transfer the multicast inter-processor packet to multiple destination processing units, and wherein the multicast inter-processor packet is received by a respective socket of each of the multiple destination processing units that is registered to be a member of a multicast group associated with the multicast IP address range.

16. The SoC of claim 11, wherein the first transport protocol layer header of the inter-processor packet being transferred within the SoC has a format resembling a transmission control protocol (TCP) header or a user datagram protocol (UDP) header.

17. The SoC of claim 11, wherein the inter-processor communication channel includes a physical bus associated with a bus protocol, and the inter-processor packet including the first transport protocol layer header is transferred within the SoC on the inter-processor communication channel using the bus protocol.

18. The method of claim 1, wherein the inter-processor communication channel uses static routes to transfer the set of inter-processor packets within the SoC.

19. The computing device of claim 5, wherein a protocol stack of the first transport protocol layer header has a lower memory utilization than a transmission control protocol (TCP) stack.

20. The SoC of claim 11, wherein a number of IP addresses being assigned in the SoC is predetermined based on a number of processing nodes in the SoC.

*     *     *     *     *